United States Patent [19]
Duvall et al.

[11] Patent Number: 5,579,421
[45] Date of Patent: Nov. 26, 1996

[54] OPTICAL INTEGRATED CIRCUITS AND METHODS

[75] Inventors: Charles Duvall, Atlanta; Ian A. White, Roswell; Henry H. Yaffe, Dunwoody, all of Ga.

[73] Assignee: Lucent Technologies Inc., Murray Hill, N.J.

[21] Appl. No.: 560,755

[22] Filed: Nov. 21, 1995

[51] Int. Cl.$^6$ .................. G02B 6/12; G02B 6/28
[52] U.S. Cl. .................. 385/14; 385/24; 385/46; 359/124
[58] Field of Search .................. 385/14, 20–24, 385/46; 359/114, 115, 124, 127

[56] References Cited

U.S. PATENT DOCUMENTS

| | | | |
|---|---|---|---|
| 4,483,582 | 11/1984 | Sheem | 385/24 |
| 4,904,042 | 2/1990 | Dragone | 350/96.16 |
| 5,136,671 | 8/1992 | Dragone | 385/46 |
| 5,285,305 | 2/1994 | Cohen et al. | 359/110 |
| 5,309,534 | 5/1994 | Cohen et al. | 385/27 |
| 5,438,444 | 8/1995 | Tayonaka et al. | 385/24 |
| 5,500,910 | 3/1996 | Boudreau et al. | 385/24 |

*Primary Examiner*—John D. Lee
*Assistant Examiner*—Phan T. H. Palmer

[57] ABSTRACT

An optical integrated circuit provides a 1×2 power splitting function for a communication system and additionally provides at least one type of upgrade capability for the system. The upgrade capability may be remote optical time domain reflectometry (OTDR) testing at an out-of-band wavelength. The OTDR testing is performed around a power splitter whereby a fault may be precisely located on an output line past the power splitter. Other upgrade capabilities that an optical integrated circuit may provide are the ability to add optical network units (ONUs) to the communication at a later time or to increase the bandwidth without requiring any new cables between a central office and the optical circuit. The optical integrated circuits can provide these upgraded capabilities with a higher reliability than circuits which are manufactured with discrete components and at a lower cost.

34 Claims, 3 Drawing Sheets

OPTICAL INTEGRATED CIRCUITS AND METHODS

FIELD OF THE INVENTION

This invention relates to optical integrated circuits and, more particularly to optical integrated circuits that provide power splitting functions in a communication system.

BACKGROUND OF THE INVENTION

In fiber-to-the-curb (FTTC) or fiber-to-the-home (FTTH) optical communication systems, signals from a central office may be distributed to a plurality of optical network units (ONUs), located in the outside plant, which may also return signals back to the central office. For the purposes of this application, an ONU can represent a single user, such as a single household (FTTH), or an ONU can represent a group of users (FTTC), such as a number of households in a certain geographical area. Also, such a communication system can employ any type of distribution system, such as a switched telephone network and/or a broadcast cable distribution system. Further, the signals may be either analog or digital data signals.

To reduce costs of FTTC or FTTH optical systems, the cost of the highest price components in these systems are preferably shared among as many customers as possible. Since the transmitters and receivers in the central office are very expensive, the cost of these items are divided among many customers by splitting the downstream optical power emitted from each transmitter and routing the split portions to multiple ONUs. Also, the cost is reduced by combining the upstream optical power signals from multiple ONUs and routing the combined signals to the central office. Often, the signals to or from each ONU can be identified by assigning a specific time slot in the data stream unique to each ONU, thereby employing time-division multiplexing.

In order to share the transmitters and receivers among multiple ONUs, optical power splitters are required. A single feeder fiber is connected to each transmitter and the light in the feeder fiber is divided at the power splitter between the distribution fibers which distribute the light to the ONUs and also routes the light from the distribution fibers onto the single feeder fiber.

Another important method to reduce the cost of the FTTH/FTTC system would be to minimize the amount of fiber that needs to be installed in the outside plant. The amount of fiber is reduced by maximizing the length of the single feeder fiber, while minimizing the lengths of the multitude of distribution fibers. The sharing of transmitters and receivers and the lengths of the feeder fiber and distribution fibers require the use of a power splitter placed between the feeder fiber and the distribution fibers and placed in the outside plant near the ONUs.

Fiber optic communications infrastructures should ideally be able to evolve as the needs of the system change over time. For instance, a communication system may originally be designed for only a certain number of ONUs. Certain circumstances, such as new real estate development in the area, might cause a demand that far exceeds the present capability of the physical fiber plant and the present number and locations of the ONUs. To meet this new demand, the communication system must be expanded, such as by adding another transmitter, adding another power splitter, adding another optical line from the transmitter to the power splitter, and adding new lines from the power splitter to each additional ONU in the system. Because each of these additions to the communication system has an associated cost, a need exists for a communication system that can be easily expanded without incurring large expenses.

Another manner in which a communication system may need to evolve involves increasing bandwidth to the existing ONUs. While the number of ONUs may be within the capability of the system, the amount of bandwidth that an ONU requires may become more than the system is able to provide. At such a time, the system may increase bandwidth by transmitting at an additional wavelength. When the communication system has power splitters, the signals at the additional wavelength are divided and sent to all of the lines connected to the power splitter, even those which do not require the additional bandwidth. A need therefore exists for a communication system that can selectively provide dedicated services by expanding the bandwidth capabilities at only those ONUs which require the additional bandwidth.

Many optical communication systems employ methods for testing faults in the communication system. One commonly used testing method is an optical time domain reflectometry (OTDR) testing method. In general, every signal transmitted from the central office is echoed back to the central office due to signal reflections, sometimes referred to as Rayleigh scattering, at locations along the length of the fibers. The echoes at the central office are fairly uniform with the delay time associated with each echo corresponding to a certain length between the central office and the point of origin of the Rayleigh scattering. A fault in the system, such as a fiber break, can be detected by monitoring the delay times of the echoes. Reference may be made to U.S. Pat. No. 5,285,305 to Cohen et al. for more details on how an optical communication system can use OTDR to detect faults in the system.

The ability of OTDR to locate a defect precisely, however, is degraded when the communication system has power splitters. When a fault occurs past the power splitter on one of the lines connected to the power splitter, OTDR can detect the distance from the central office to the fault, but is unable to determine on which one of the two or more lines past the power splitter the fault occurred. To identify the location of the fault, service personnel must be sent to the various lines connected to the power splitter at locations which are at the detected distance from the defect to the central office. The time spent by the service personnel in locating the fault increases the time that the system in inoperable due to a particular fault and also adds to the overall cost of operating the communication system. A need therefore exists for a communication system which has power splitters, which can detect faults, and which can quickly and precisely locate the faults.

SUMMARY OF THE INVENTION

The present invention, in a preferred embodiment thereof, is an optical circuit which provides a basic 1×N power splitting function for a communication system, but which can also provide at least one additional upgrade feature for the communication system. For instance, the optical circuit may perform a 1×2 power splitting function for light at a first wavelength, but may provide a second wavelength of light to only a particular one of the two output lines. The second wavelength of light may be used by the communication system to increase the bandwidth capability selectively to an optical network unit (ONU). Alternatively, the second wavelength of light may be used with out-of-band optical time domain reflectometry (OTDR) testing so that faults can be precisely located past a power splitter on one of the two or more output lines.

In another embodiment of the invention, an optical circuit may provide the basic 1×2 power splitting function at the first wavelength of light and output light at a second wavelength on two other output lines. Thus, the optical circuit can operate as a 1×2 power splitter when only one wavelength is used or as a 1×4 power splitter when both wavelengths are used. The optical circuit according to the invention can have other variations as well, such as additional inputs at one or more wavelengths, a redundant input, or various number of output lines.

The optical circuits according to the invention are preferably manufactured on an optical integrated circuit, such as by planar waveguide technology. The optical circuits all comprise at least one power splitter and at least one wavelength division multiplexer to which it is optically interconnected and may additionally comprise another power splitter or another wavelength division multiplexer. By fabricating the optical circuits as integrated planar waveguide devices, the optical circuits are relatively inexpensive and highly reliable in comparison to circuits formed with discrete components.

Thus, in general, the invention combines a 1×N power splitting function with wavelength division multiplexers into a variety of optical circuits for various applications, such as those described for FTTH/FTTC. These optical circuits can be made from discrete fiber based devices or, preferably, as integrated optical planar waveguide circuits. The integration of wavelength division multiplexing devices with the 1×N power splitters enables network upgradeability in available features and bandwidth with minimal change in the outside plant. In some of the optical circuit designs, more than one feeder fiber may be supplied to the optical circuit in the outside plant. In these cases, the potential benefits from installing a more flexible network at the outset may outweigh the extra cost of installing the extra feeder fibers.

The principles and features of the present invention will be more readily apparent and understood from the following detailed descriptions read in conjunction with the accompanying drawings.

BRIEF DESCRIPTION OF THE DRAWINGS

The present invention can be better understood with reference to the following drawings. Note that like reference numerals designate corresponding parts throughout the several views.

DETAILED DESCRIPTION

Figure 1:
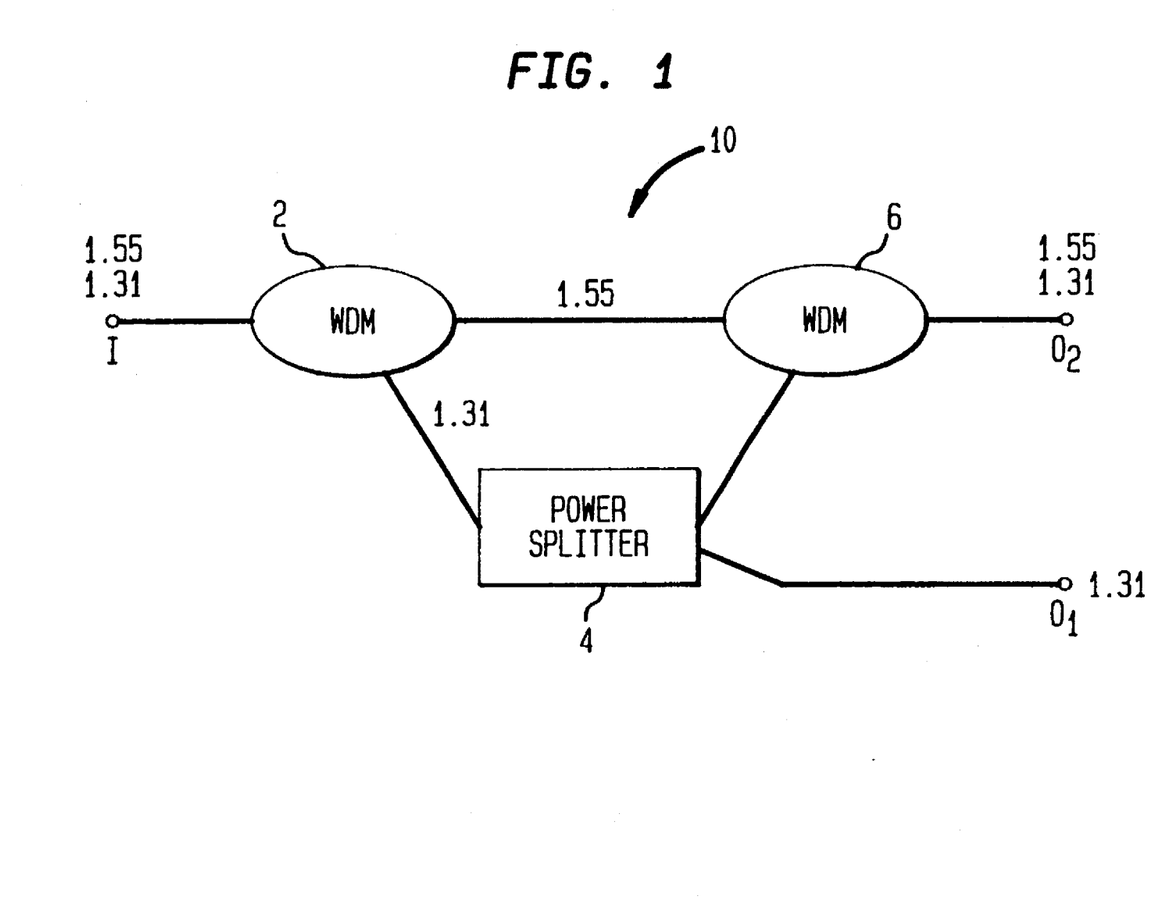
FIG. 1 is a first embodiment of a power splitter optical circuit in accordance with the invention.

With reference to FIG. 1, an optical circuit 10 according to a first embodiment of the invention comprises a first wavelength division multiplexer 2, a power splitter 4, and a second wavelength multiplexer 6. The first wavelength division multiplexer 2 receives light at a wavelength of 1.31 microns over an input line I and routes this light towards the power splitter 4, where the light is evenly distributed between the second wavelength division multiplexer 6 and a first output line $O_1$. The second wavelength division multiplexer 6 outputs the other portion of the 1.31 micron light on a second output line $O_2$. Thus, with light at a wavelength of 1.31 microns, the circuit 10 operates as a typical 1×2 power splitter whereby an input signal, such as a signal from a central office, is divided and routed over two output lines $O_1$ and $O_2$, which can be, for example, output lines leading to separate optical network units (ONUs) in a communications system.

When light is received at a wavelength of 1.55 microns over input line I, the wavelength division multiplexer 2 routes the 1.55 micron light only to the second wavelength division multiplexer 6, which then outputs the 1.55 micron light on the second output line $O_2$. The light at a wavelength of 1.55 microns can advantageously be used to provide an upgrade capability to the communication system without requiring any modification to the circuit 10 and without requiring any additional optical lines.

For example, the light at a wavelength of 1.55 microns can be used in optical time domain reflectometry (OTDR) testing. When OTDR testing is performed with light at a wavelength of 1.31 microns, a fault can be detected in the communication system but the OTDR testing is unable to determine whether the fault occurred on the first output line $O_1$ or the second output line $O_2$. As a result, service personnel previously had to travel to one of the two locations in order to precisely locate the fault. With the circuit 10 according to the invention, OTDR testing with light at a wavelength of 1.55 microns can be used to measure around the power splitter 4 and to identify the output line upon which the fault is located. More specifically if a fault was detected with OTDR testing with light at wavelengths of 1.55 microns and 1.31 microns, then the fault must be located on the second output line $O_2$, since the 1.55 micron light does not enter the first output line $O_1$. On the other hand, if the fault is detected with OTDR testing only at the 131 micron wavelength and not at the 1.55 micron wavelength, then the fault must lie on the first output line $O_1$. Therefore, in addition to providing a basic 1×2 power splitting function, the optical circuit 10 can also provide OTDR testing which can measure around the power splitter 4 and indicate the precise location of a fault.

Rather than using the 1.55 micron light for OTDR testing, the 1.55 micron light can be used to increase the bandwidth of the communication system. Because the second output line $O_2$ receives light at wavelengths of 1.55 microns and 1.31 microns, the second output line $O_2$ has twice the bandwidth of the first output line $O_1$. Thus, with the optical circuit 10, an extra amount of bandwidth can be supplied to only those ONUs which require the added bandwidth, such as an ONU connected to the second output line $O_2$, and need not be supplied to all of the ONUs in the communication system, such as an ONU connected to the first output line $O_1$. The circuit 10 therefore provides dedicated service to the ONU on output line $O_2$.

The optical integrated circuit 10 can be used to provide basic 1×2 splitting functions and is fully capable of providing upgraded features to a communication system. The communication system can originally have the optical circuit 10 perform its basic function of power splitting of light at a wavelength of 1.31 microns. At a later date, when the communications system is upgraded to have OTDR testing or to provide a larger bandwidth to some of the ONUs, a transmitter outputting light at a wavelength of 1.55 microns can be added to the central office at a relatively low cost to the overall communication system. Because the optical integrated circuit 10 already has the capability to provide the expanded bandwidth or to provide OTDR testing, service personnel do not have to add any discrete elements to a power splitter in the field nor do the service personnel have to bury any additional optical cables. Therefore, the cost of upgrading the communication system is relatively low.

Figure 2:
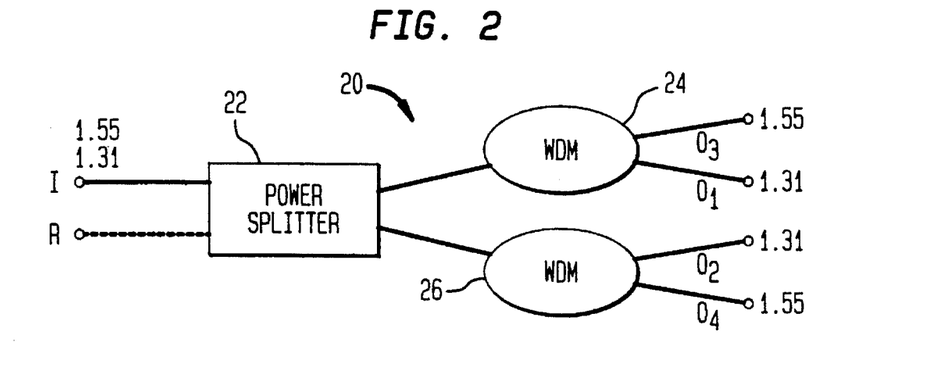
FIG. 2 is a second embodiment of a power splitter optical circuit in accordance with the invention.

An optical circuit 20 according to a second embodiment of the invention, as shown in FIG. 2, comprises a power splitter 22, a first wavelength division multiplexer 24, and a second wavelength division multiplexer 26. The power splitter 22 receives light at a wavelength of 1.31 microns over an input line I, divides this light into two portions, and routes these two portions to the first and second wavelength division multiplexers 24 and 26, respectively. The first wavelength division multiplexer 24 outputs the 1.31 micron light on a first output line $O_1$ and the second wavelength division multiplexer 26 outputs the 1.31 micron light on a second output line $O_2$. The optical circuit 20 therefore provides a basic 1×2 power splitting function whereby light at a wavelength of 1.31 microns on the input line I is split and routed onto two output lines $O_1$ and $O_2$.

The optical circuit 20 can also provide an upgrade capability to a communication system. If, at a later date, the communication system needs to expand to accommodate more ONUs, the optical circuit 20 can be turned into a 1×4 power splitter whereby light from the input line I is split onto four output lines $O_1$ to $O_4$. As with light at 1.31 microns, the power splitter 22 receives light at a wavelength of 1.55 microns, divides this light into two portions, and routes the two portions of this light to the first and second wavelength division multiplexers 24 and 26, respectively. The first wavelength division multiplexer 24 outputs the first portion of the 1.55 micron light on a third output line $O_3$ and the second wavelength division multiplexer 26 outputs the second portion of the 1.55 micron on a fourth output line $O_4$. Thus, the optical circuit 20 can be installed for a basic 1×2 power splitting function and can later be expanded to accommodate a 1×4 power splitting arrangement.

The optical circuit 20 may also be provided with a redundant path. For instance, as shown in FIG. 2, the power splitter 22 may have a redundant path R which can become active if communication over input line I between the power splitter 22 and a central office is disrupted. The redundant path R is activated, in a manner which is known to those skilled in the art, when communication on the input line I is disrupted, thereby ensuring that communication is not interrupted between the central office and the ONUs past the power splitter 22.

Figure 3:
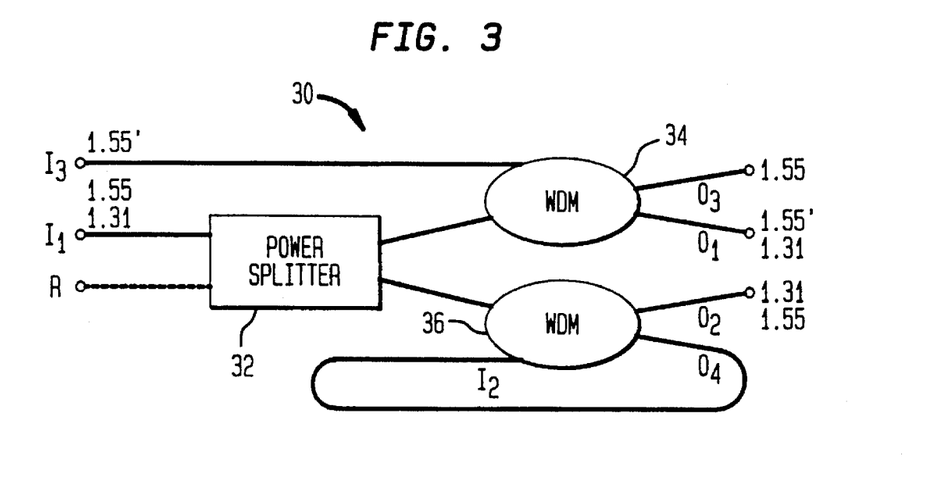
FIG. 3 is a third embodiment of a power splitter optical circuit in accordance with the invention.

An optical circuit 30 according to a third embodiment of the invention, as shown in FIG. 3, comprises a power splitter 32, a first wavelength division multiplexer 34, and a second wavelength division multiplexer 36. The circuit 30 operates similar to optical circuit 20 in that light at a wavelength of 1.31 microns is received at the power splitter 32, divided into first and second portions, and then routed to the first and second wavelength division multiplexers 34 and 36, respectively. The first and second wavelength division multiplexers 34 and 36 output the first and second portions of the 1.31 micron light on output lines $O_1$ and $O_2$, respectively. The optical circuit 30 therefore provides the basic 1×2 power splitting function for light at a wavelength of 1.31 microns.

The optical circuit 30 differs from optical circuit 20 in that the fourth output line $O_4$ forms a second input $I_2$ to the optical circuit which is connected to a second input to the second wavelength division multiplexer 36. In operation, when light at a wavelength of 1.55 microns enters the power splitter 32, the 1.55 micron light is routed to both wavelength division multiplexers 34 and 36 with a first portion of the 1.55 micron light being output by the first wavelength division multiplexer 34 on output line $O_3$. The second wavelength division multiplexer 36 outputs the second portion of the 1.55 micron light on the fourth output line $O_4$ where the 1.55 micron light is routed back to the wavelength division multiplexer 36 over input line $I_2$. The second portion of the 1.55 micron light is then passed through to the second output line $O_2$. Thus, by converting the fourth output line $O_4$ into a second input line $I_2$, the second output line $O_2$ can be provided with twice the bandwidth capability.

The optical circuit 30 may also be provided with the capability of OTDR testing with light at a wavelength of 1.55 microns. If light at a wavelength of 1.55 microns is supplied directly to the first wavelength division multiplexer 34 over an input line $I_3$, the 1.55 micron light will be output on the first output line $O_1$. In this figure, the 1.55 micron light supplied over input line $I_3$ is depicted as 1.55' in order to distinguish this 1.55 micron light from the 1.55 micron light supplied over input line $I_1$. If a fault is detected with OTDR testing at 1.31 microns, OTDR testing can be performed at 1.55 microns to measure around the power splitter 32 and to determine upon which output line $O_1$ or $O_2$ the fault is located.

It should be understood that the 1.55 micron light supplied to wavelength division multiplexer 34 over input line $I_3$ may be used instead to increase the bandwidth capability for an ONU connected to output line $O_1$ and that the 1.55 micron light supplied over input line $I_2$ to the power splitter 32 may be used instead for OTDR testing. Further, the optical circuit 30 may be formed with only one of the input lines $I_3$ or $I_1$ whereby light at 1.55 microns is supplied to either the wavelength division multiplexer 34 or the power splitter 32.

Figure 4:
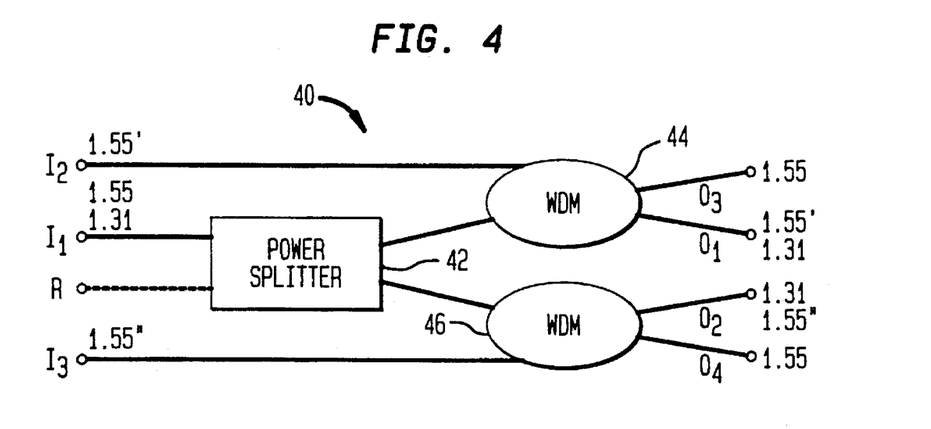
FIG. 4 is a fourth embodiment of a power splitter optical circuit in accordance with the invention.

An optical circuit 40 according to a fourth embodiment of the invention, as shown in FIG. 4, comprises a power splitter 42, a first wavelength division multiplexer 44, and a second wavelength division multiplexer 46. The optical circuit 40 provides a basic 1×2 power splitting function at 1.31 microns of light by splitting light at a wavelength of 1.31 microns over input line $I_2$ onto first and second output lines $O_1$ and $O_2$.

As with the optical circuit 20 in FIG. 2, the optical circuit 40 receives light at a wavelength of 1.55 microns and routes first and second portions of this light to third and fourth output lines $O_3$ and $O_4$, respectively. Thus, the optical circuit 40 can be upgraded from a 1×2 power splitter into a 1×4 power splitter 4. As a result, the communication system can accommodate additional ONUs without requiring any modification to the circuit 40 or any additional cables between the central office and the circuit 40.

The optical circuit 40 also receives light at a wavelength of 1.55 microns over a second input line $I_2$ and over a third input line $I_3$. In order to distinguish the 1.55 micron lights on input lines $I_1$ to $I_3$, the 1.55 micron lights have been labelled as 1.55, 1.55' and 1.55" for input lines $I_1$ to $I_3$, respectively. The 1.55' micron light on input line $I_2$ is supplied to the first wavelength division multiplexer 44 which routes the 1.55' micron light to the first output line $O_1$. The 1.55' micron light on input line is supplied to the wavelength division multiplexer 46 which routes the 1.55" micron light to a second output line $O_2$. The light supplied at 1.55 microns to the wavelength division multiplexers 44 and 46 may be used for OTDR testing or may be used to provide additional bandwidth capabilities to ONUs on the output lines $O_1$ and $O_2$.

Figure 5:
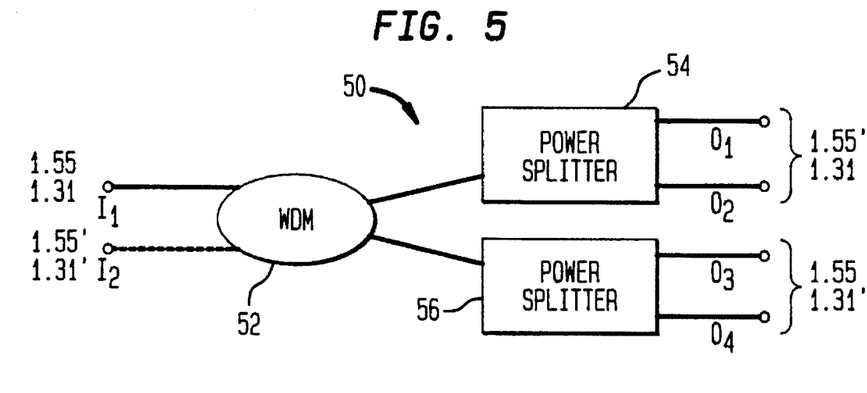
FIG. 5 is a fifth embodiment of a power splitter optical circuit in accordance with the invention.

An optical circuit 50 according to a fifth embodiment of the invention, as shown in FIG. 5, comprises a wavelength division multiplexer 52, a first power splitter 54, and a second power splitter 56. In a first mode of operations light at a wavelength of 1.31 microns is received over input line $I_1$ by the wavelength division multiplexer 52 and is supplied to only the power splitter 54. The power splitter 54 divides the 1.31 micron light into two portions and outputs these two portions onto first and second output lines $O_1$ and $O_2$, respectively. In this first mode, the optical circuit 50 operates as a typical 1×2 power splitter and may provide a basic service to a communication system.

In an upgraded mode of operation, the optical circuit 50 may also receive light at a wavelength of 1.55 microns over the first input line $I_1$. The 1.55 micron light over input line $I_1$ is directed by the wavelength division multiplexer 52 to the second power splitter 56 which then divides the 1.55 micron light into two portions and outputs the two portions on third and fourth output lines $O_3$ and $O_4$, respectively. The optical circuit 50 in this upgraded mode of operation therefore performs as a 1×4 power splitter whereby a communication system can be expanded to accommodate additional ONUs.

In another upgraded mode of operation, light at a wavelength of 1.31 microns is received on a second input line $I_2$ and is routed by the wavelength division multiplexer 52 to only the second power splitter 56. The 1.31 micron light on input line $I_2$ is depicted as 1.31' in order to distinguish it from the 1.31 light on input line $I_1$. The second power splitter 56 divides the 1.31 micron into two portions which are output on the third and fourth output lines $O_3$ and $O_4$, respectively. In this modes output lines $O_1$ and $O_2$ can provide a basic service to its ONUs whereas output lines $O_3$ and $O_4$ can provide an increased bandwidth to its ONUs.

In a still further upgraded mode of operation, light at a wavelength of 1.55 microns is supplied over input line $I_2$ to the wavelength division multiplexer 52 and is routed to only the first power splitter 54 where the 1.55 micron light is divided and routed onto output lines $O_1$ and $O_2$. The 1.55 micron light on input line $I_2$ is depicted as 1.55' in order to distinguish it from the 1.55 light on input line $I_1$. This mode of operation for the circuit 50 can be used by a communication system to provide increased bandwidth to the ONUs connected to output lines $O_1$ and $O_2$.

It should be understood that the 1.31 micron light and the 1.55 micron light could alternatively provide out-of-bandwidth OTDR testing on the output lines $O_1$ to $O_4$. Also, a communication system can selectively use any combination of 1.31 micron light or 1.55 micron light on input lines $I_1$ and $I_2$ in order to selectively modify the outputs on output lines $O_1$ to $O_4$.

Figure 6:
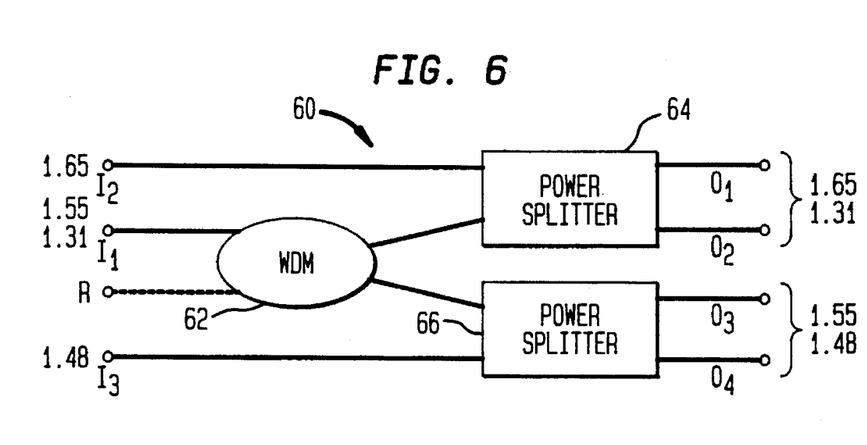
FIG. 6 is a sixth embodiment of a power splitter optical circuit in accordance with the invention.

An optical circuit 60 according to a sixth embodiment of the invention, as shown in FIG. 6, comprises a wavelength division multiplexer 62, a first power splitter 64, and a second power splitter 66. When the optical circuit 60 receives light at a wavelength of only 1.31 microns over a first input line $I_1$, the circuit 60 operates as a 1×2 power splitter with portions of the 1.31 light being output on output lines $O_1$ and $O_2$. When light is received at wavelengths of both 1.31 microns and 1.55 microns over the first input line $I_1$, the circuit 60 can be upgraded effectively to a 1×4 power splitter by dividing the light on input line $I_1$ into four outputs respectively placed on output lines $O_1$ to $O_4$.

The optical circuit 60 differs from optical circuit 50 in that a second input to the wavelength division multiplexer 62 is a redundant path. The optical circuit 60 also differs from optical circuit 50 in that the first power splitter 64 could receive light at one out-of-band wavelength, such as at 1.65 microns, over a second input line $I_2$ and output this light in two portions onto output lines $O_1$ and $O_2$, respectively. The light at 1.65 microns can be used to provide additional bandwidth capabilities to ONUs connected to output lines $O_1$ and $O_2$ or may alternatively be used to provide out-of-band OTDR testing to output lines $O_1$ or $O_2$.

The optical circuit 60 can also receive light at an out-of-band wavelengths such as 1.48 microns, over input line $I_3$. The 1.48 micron light is received by the second power splitter 66 and is output in two portions onto output lines $O_3$ and $O_4$, respectively. As with light at 1.65 microns, the 1.48 micron light may be used for OTDR testing for ONUs connected to the output lines $O_3$ and $O_4$.

Each of the optical circuits is preferably an integrated optical circuit which is manufactured using planar waveguide technology. With regard to FIG. 3, the loop connecting the fourth output line $O_4$ to the second input line $I_2$ is preferably an optical fiber which could be removed, if desired, to convert optical circuit 30 into optical circuit 20. The manufacturer of an optical circuit on a planar waveguide platform is within the capability of one of ordinary skill in the art and will accordingly not be described in full detail. The process for fabricating an optical circuit using planar waveguide technology platform is described in U.S. Pat. No. 4,092,086 to Henry et al., which is hereby incorporated by reference. Also, a single integrated circuit preferably has more than one optical circuit in order to maximize the usage of space on the substrate chip.

The cost for fabricating one of the optical circuits according to the invention as an integrated circuit is much less than the cost associated with fabricating a circuit with discrete components. The cost of an optical integrated circuit is not proportionate to the number of components on the circuit but rather depends on the size of the chip and the interconnection of optical fibers to the circuits on the chip. Hence, additional components, such as wavelength division multiplexers or power splitters, may be added with only a nominal increase in overall cost. By contrast, the fabrication of a circuit with discrete components is increased substantially with each additional component.

The optical circuits according to the invention can also be much more reliable when the circuits are formed as integrated circuits than with discrete components. If an optical circuit is formed with discrete components, each component and each interconnection between two or more components has certain risks of failure. Each additional component therefore increases the risk of failure for the entire optical circuit. If the circuit according to the invention is fabricated as an integrated planar waveguide circuit, on the other hand, the components and interconnections between components are fabricated in a monolithic piece simultaneously on the same substrate whereby the risk of failure is relatively low and independent of the number of components or interconnections.

Each of the optical circuits according to the invention provides a basic 1×2 power splitting function which can be used by a communications system to split light at 1.31 microns and to direct the split portions of light to two separate ONUs. Each of the circuits according to the invention also provides some type of upgrade capability for the communication system. For instance, some of the optical circuits can be upgraded to accommodate an increased number of ONUs while other optical circuits permit existing ONUs to have a dedicated increase in bandwidth capability. Also, other optical circuits permit out-of-band OTDR testing to detect faults on the output lines.

The foregoing has been illustrative of the features and principles of the present invention. Various changes or modifications to the invention may be apparent to those skilled in the art without departure from the spirit and scope of the invention. All such changes or modifications are intended to be included herein and within the scope of the invention.

For example, the wavelength division multiplexers have been described as being 1.31/1.55 micron multiplexers since the circuits operate with light at wavelengths of either 1.31 microns or 1.55 microns. The invention is not limited to this specific type of multiplexer but may have other types of multiplexers, such as multiplexers operating at other wavelengths. Also, the power splitter has been described as evenly splitting the power from an input signal into two output signals. The power splitter may alternatively divide the input signal into any number of output signals and may also divide the input signal into output signals having unequal parts.

Also, the OTDR testing has been described as being with light at wavelengths of 1.55 microns, 1.48 microns, or 1.65 microns since these wavelengths are typically out of the bandwidth for communication signals operating at 1.31 microns. The communication signals and the OTDR testing may alternatively be performed at wavelengths other than those disclosed. Further, as has been described above, the 1.48, 1.55, and 1.65 micron light may be used to provide communication capabilities rather than OTDR testing.

Further, a wavelength division multiplexer can be any device which spatially separates the input light into transmission wavelength channels i, defined by the spectral bands $\lambda_i \pm \delta\lambda_i$ at the output ports. In fiber optical communications, two primary wavelength windows, defined to be approximately 1260–1360 nm and 1480–1580 nm, are commonly used for the transmission of optical commications. These two spectral windows are usually referred to by their central wavelengths, namely the 1300 window and the 1550 window, respectively. It should be noted that communication or test wavelength channels can be defined to use all or only part of the 1330 or 1550 transmission windows. Also, other wavelength channels may be used for testing of the fiber, for instance by OTDR with an out-of-band wavelength. These additional out-of-band wavelength channels may be below the 1300 window, above the 1550 window, or in between the 1300 and 1550 windows. A wavelength division multiplexer may be designed to group different spectral channels to a common output port depending on the desired optical function. The wavelength division multiplexer advantageously permits the addition of additional wavelength channels to the power splitting functions in the FTTC/FTTH systems, thereby upgrading the network by increasing the bandwidth, or by providing an optical port for remote testing of the fiber network.

We claim:

1. An optical circuit for receiving a first optical signal at a first wavelength on an input line and for splitting said first optical signal onto a first output line and a second output line said optical circuit comprising:

a first wavelength division multiplexer;

a power splitter; and a second wavelength division multiplexer;

said first wavelength division multiplexer for receiving said first optical signal at said first wavelength on said input line and for routing said first optical signal to said power splitter;

said power splitter outputting a first portion of said first optical signal on said first output line and routing a second portion of said first optical signal to said second wavelength division multiplexer;

said second wavelength division multiplexer outputting said second portion of said first optical signal on said second output line;

said first wavelength division multiplexer passing a second optical signal at a second wavelength to said second wavelength division multiplexer and said second wavelength division multiplexer outputting said second optical signal on said second output line;

wherein said first optical signal at said first wavelength is routed onto said first and second output lines and said second optical signal at said second wavelength is supplied to said second output line and not to said first output line.

2. The optical circuit as set forth in claim 1, wherein said first wavelength division multiplexer said power splitter, and said second wavelength division multiplexer comprise a single optical integrated circuit.

3. The optical circuit as set forth in claim 2, wherein said optical circuit comprises a planar waveguide integrated optical circuit.

4. The optical circuit as set forth in claim 1, wherein said second optical signal is used with optical time domain reflectometry testing to determine whether a fault is on said first output line or said second output line.

5. The optical circuit as set forth in claim 1, wherein an available bandwidth is larger for said first output line than said second output line.

6. The optical circuit as set forth in claim 1, wherein said first wavelength division multiplexer, said power splitter, and said second wavelength division multiplexer are each comprised of a discrete component.

7. The optical circuit as set forth in claim 1, wherein said input line comprises a feeder fiber and said first and second output lines comprise distribution fibers.

8. An optical circuit for receiving a first optical signal at a first wavelength on an input line and for splitting said first optical signal onto at least a first output line and a second output line, said optical circuit comprising:

a first wavelength division multiplexer;

a second wavelength division multiplexer; and a power splitter for receiving said first optical signal and for outputting a first portion of said first optical signal to a first input of said first wavelength division multiplexer and for outputting a second portion of said first optical signal to a first input of said second wavelength division multiplexer;

said first wavelength division multiplexer for outputting said first portion of said first optical signal on said first output line and said second wavelength division multiplexer for outputting said second portion of said first optical signal on said second output line;

said power splitter also for receiving a second optical signal at a second wavelength on said input line and for outputting a first portion of said second optical signal to said first input of said first wavelength division multiplexer with said first wavelength division multiplexer outputting said first portion of said second optical signal on a third output line of said circuit;

wherein said first optical signal at said first wavelength is routed onto said first and second output lines and said second optical signal at said second wavelength is routed to said third output line.

9. The optical circuit as set forth in claim 8, wherein said first wavelength division multiplexer, said power splitter, and said second wavelength division multiplexer comprise a single optical integrated circuit.

10. The optical circuit as set forth in claim 9, wherein said optical circuit comprises a planar waveguide integrated optical circuit.

11. The optical circuit as set forth in claim 8, wherein said first wavelength division multiplexer, said power splitter, and said second wavelength division multiplexer are each comprised of a discrete component.

12. The optical circuit as set forth in claim 8, wherein said power splitter outputs a second portion of said second optical signal to said first input of said second wavelength division multiplexer and said second wavelength division multiplexer outputs said second portion of said second optical signal on a fourth output line of said circuit.

13. The optical circuit as set forth in claim 12, wherein said fourth output line of said circuit is connected to a second input of said second wavelength division multiplexer so that said second wavelength division multiplexer outputs said second portion of said second optical signal on said second output line along with said second portion of said first optical signal.

14. The optical circuit as set forth in claim 13, wherein an available bandwidth is larger for said second output line than said first output line.

15. The optical circuit as set forth in claim 8, further comprising a third optical signal at said second wavelength received at a second input to said first wavelength division multiplexer and wherein said first wavelength division multiplexer outputs said third optical signal on said first output line.

16. The optical circuit as set forth in claim 15, wherein said third optical signal is used with optical time domain reflectometry to determine whether a fault occurs on said first output line or said second outpost line.

17. The optical circuit as set forth in claim 8, further comprising a third optical signal at said second wavelength received at a second input to said second wavelength division multiplexer and wherein said second wavelength division multiplexer outputs said third optical signal on said second output line.

18. The optical circuit as set forth in claim 8, wherein said third optical signal is used with optical time domain reflectometry to determine whether a fault occurs on said first output line or said second output line.

19. The optical circuit as set forth in claim 8, wherein said input line comprises a feeder fiber and said first and second output lines comprise distribution fibers.

20. An optical circuit for receiving a first optical signal at a first wavelength on an input line and for splitting said first optical signal onto at least a first output line and a second output line, said optical circuit comprising:

a first wavelength division multiplexer;

a second wavelength division multiplexer; and a power splitter for receiving said first optical signal and for outputting a first portion of said first optical signal to a first input of said first wavelength division multiplexer and for outputting a second portion of said first optical signal to a first input of said second wavelength division multiplexer;

said first wavelength division multiplexer for outputting said first portion of said first optical signal on said first output line and said second wavelength division multiplexer for outputting said second portion of said first optical signal on said second output line;

said first wavelength division multiplexer also for receiving a second optical signal at a second wavelength at a second input and for outputting said second optical signal on said first output line;

wherein said first optical signal at said first wavelength is routed onto said first and second output lines and said second optical signal at said second wavelength is routed to said first output line.

21. The optical circuit as set forth in claim 20, wherein said second optical signal is used with optical time domain reflectometry to determine whether a fault occurs on said first output line or said second output line.

22. An optical circuit for receiving a first optical signal at a first wavelength on an input line and for splitting said first optical signal onto at least a first output line and a second output line, said optical circuit comprising:

a first power splitter;

a second power splitter; and a wavelength division multiplexer for receiving said first optical signal at said first wavelength and for routing said first optical signal to said first power splitter;

said first power splitter for outputting a first portion of said first optical signal onto said first output line and for outputting a second portion of said first optical signal onto said second output line;

a second optical signal at a second wavelength on said input line being routed by said wavelength division multiplexer to said second power splitter and said second power splitter outputting a first portion of said second optical signal on a third output line and outputting a second portion of said second optical signal on a fourth output line;

wherein said wavelength division multiplexer and said first power splitter routes said first optical signal onto said first and second output lines and said wavelength division multiplexer and said second power splitter route said second optical signal onto said third and fourth output lines.

23. The optical circuit as set forth in claim 22, further comprising a third optical signal at said first wavelength supplied to a second input of said wavelength division multiplexer and wherein said third optical signal is routed by said second power splitter to said third and fourth output lines.

24. The optical circuit as set forth in claim 23, wherein said third optical signal is used with time domain reflectometry to detect faults on said third and fourth output lines.

25. The optical circuit as set forth in claim 23, wherein an available bandwidth is larger for said third and fourth output lines than said first and second output lines.

26. The optical circuit as set forth in claim 22, wherein said wavelength division multiplexer, said first power splitter, and said second power splitter comprise a single optical circuit.

27. The optical circuit as set forth in claim 26, wherein said optical circuit comprises a planar waveguide integrated optical circuit.

28. The optical circuit as set forth in claim 22, wherein said wavelength division multiplexers and said first and second power splitters are each comprised of a discrete component.

29. The optical circuit as set forth in claim 22, wherein said first power splitter is also connected to a second input line and said first power splitter routes a third optical signal on said second input line onto said first and second output lines.

30. An optical circuit for receiving a first optical signal at a first wavelength on an input line and for splitting said first optical signal onto at least a first output line and a second output line, said optical circuit comprising:

a power splitter; and a wavelength division multiplexer for receiving said first optical signal at said first wavelength and for routing said first optical signal to said power splitter;

said power splitter for outputting a first portion of said first optical signal onto said first output line and for outputting a second portion of said first optical signal onto said second output line;

said wavelength division multiplexer having a second input for receiving a second optical signal at a second wavelength and outputting said second optical signal to said power splitter and said power splitter outputting a first portion of said second optical signal on said first output line and a second portion of said second optical signal on said second output line;

wherein said wavelength division multiplexer and said power splitter route said first optical signal onto said first and second output lines and route said second optical signal on said first and second output lines.

31. The optical circuit as set forth in claim 30, wherein said wavelength division multiplexer and said power splitter comprise a single optical circuit.

32. The optical circuit as set forth in claim 31, wherein said optical circuit comprises a planar waveguide integrated optical circuit.

33. The optical circuit as set forth in claim 30, wherein said second optical signal is for increasing an available bandwidth at said first and second output lines.

34. The optical circuit as set forth in claim 30, wherein said second ptical signal is for testing said first and second output lines with optical time domain reflectometry.

* * * * *